United States Patent [19]
Darnell

[11] Patent Number: 5,819,585
[45] Date of Patent: Oct. 13, 1998

[54] VEHICLE TRANSMISSIONS WITH AUTOMATIC SAFETY OVERRIDE WHEN IN MANUAL MODE

[75] Inventor: Paul Malcolm Darnell, Leamington Spa, Great Britain

[73] Assignee: Kongsberg Techmatic UK Limited, Leamington Spa, England

[21] Appl. No.: 732,295

[22] PCT Filed: Mar. 15, 1996

[86] PCT No.: PCT/GB96/00572

§ 371 Date: Oct. 30, 1996

§ 102(e) Date: Oct. 30, 1996

[87] PCT Pub. No.: WO96/28317

PCT Pub. Date: Sep. 19, 1996

[30] Foreign Application Priority Data

Mar. 15, 1995 [GB] United Kingdom .................... 9505174

[51] Int. Cl.[6] ............................ B60K 41/22; F16H 61/02
[52] U.S. Cl. ............................ 74/335; 94/336 R; 447/79; 447/86
[58] Field of Search ................................. 74/335, 336 R; 477/79, 86, 120

[56] References Cited

U.S. PATENT DOCUMENTS

| | | | |
|---|---|---|---|
| 5,050,079 | 9/1991 | Steeby | 477/76 X |
| 5,105,675 | 4/1992 | Langford et al. | 74/335 |
| 5,127,288 | 7/1992 | Hojo et al. | 74/335 |
| 5,277,290 | 1/1994 | Lasoen | 74/335 X |
| 5,315,514 | 5/1994 | Steeby et al. | 74/336 R X |
| 5,425,686 | 6/1995 | Grange | 74/335 X |
| 5,444,623 | 8/1995 | Genise | 74/335 X |
| 5,520,593 | 5/1996 | Yesel et al. | 74/336 R X |
| 5,592,851 | 1/1997 | Bates et al. | 477/108 X |
| 5,611,245 | 3/1997 | McKee | 74/336 R X |
| 5,706,197 | 1/1998 | Stasik et al. | 74/335 X |

FOREIGN PATENT DOCUMENTS

| | | |
|---|---|---|
| 431538 | 6/1991 | European Pat. Off. . |
| 3201440 | 9/1983 | Germany . |

*Primary Examiner*—Khoi Q. Ta
*Attorney, Agent, or Firm*—Paul E. Milliken; Lee A. Germain

[57] ABSTRACT

A vehicle transmission having a main drive clutch (14), a multi-ratio gearbox (12), a gear engaging mechanism (25) for engaging the operative ratio of the gearbox, and a manually operable gear selector (24) allowing the operator to manually select the operative ratio of the gearbox when the transmission is acting in a manual mode. An electronic control unit (36) is also included which controls the disengagement and engagement of the drive clutch at start-up and halting of the associated vehicle and during gear changes and which controls the operation of the gear engaging mechanism (25) in response to movements of the gear selector (24). The electronic control unit (36) is also arranged to override the gear ratio currently selected by the operator to select a more appropriate gear ratio for the current conditions if a predetermined operating condition occurs when in its manual mode. The transmission may also have an automatic mode of operation, the electronic control means (36) will then also determine which gear ratio is to be selected when the transmission is operating in its automatic mode.

12 Claims, 2 Drawing Sheets

VEHICLE TRANSMISSIONS WITH AUTOMATIC SAFETY OVERRIDE WHEN IN MANUAL MODE

BACKGROUND OF INVENTION

This invention relates to vehicle transmissions which include multi-ratio gearbox and in particular to transmissions which have an automatic ratio selection mode.

SUMMARY OF INVENTION

It is an object of the present invention to provide an improved form of vehicle transmission.

Thus according to the present invention there is provided a vehicle transmission comprising a main drive clutch, a multi-ratio gearbox, a gear engaging mechanism for engaging the operative ratio of the gearbox, a manually operable gear selector allowing an operator to manually select the operative ratio of the gearbox when the transmission is acting in a manual mode, and an electronic control means which controls the disengagement and engagement of the drive clutch at start-up and halting of the associated vehicle and during gear changes and which controls the operation of the gear engaging mechanism in response to movements of the gear selector, the transmission being characterised in that the electronic control means is arranged to override the gear ratio currently selected by the operator to select a more appropriate gear ratio for the current conditions if a predetermined operating condition occurs when in its manual mode.

In a preferred arrangement the transmission also has an automatic mode of operation and the electronic control means also determines which gear ratio is to be selected when the transmission is operating in its automatic mode.

Typically the override of the manual mode will occur if any one of the following predetermined operating conditions occurs:

1. If a predetermined engine speed is exceeded an upshift of gear ratio will be implemented.
2. If engine speed falls below a predetermined level (eg 1050 rpm) a downshift of gear ratio will be implemented. The electronic control means may be set up so that the downshift only occurs if the engine speed resulting from the lower ratio gear selection still remains below a present limit (eg 1050+300 rpm).

The transmission will also preferably allow the operator to override the gear automatically selected by the transmission if he so wishes.

BRIEF DESCRIPTION OF DRAWINGS

The present invention will now be described by way of example only, with reference to the accompanying drawings in which.

DESCRIPTION OF THE PREFERRED EMBODIMENT

Figure 1:
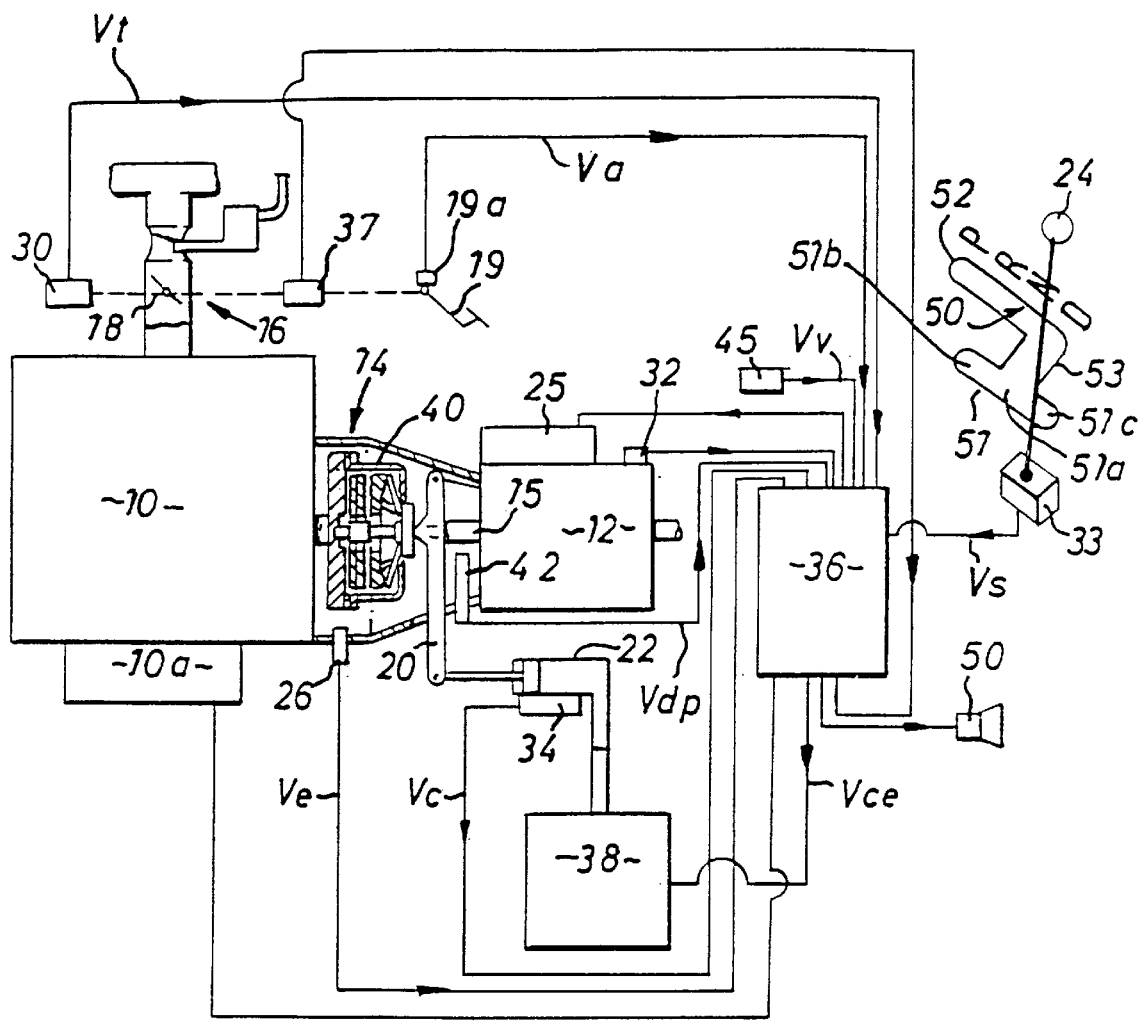
FIG. 1 shows in diagrammatic form the general layout of a vehicle transmission embodying the present invention.
Figure 3:
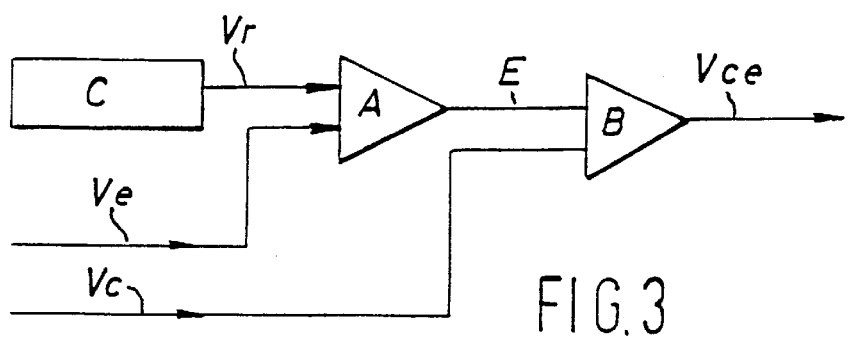
FIG. 3 shows diagrammatically the generation of the clutch engagement control signal.

Referring to FIG. 1 this shows an engine 10 with a starter and an associated starter circuit 10a which is coupled through a friction clutch 14 with a five speed lay-shaft type gearbox 12 via a gearbox input shaft 15. In the example described, fuel is supplied to the engine by a throttle 16 which includes a throttle valve 18 operated by accelerator pedal 19. The invention is equally applicable to electronic or mechanical fuel injected petrol or diesel engines.

The clutch 14 is actuated by a release fork 20 which is operated by a slave cylinder 22.

The selection of the operative ratio of the gearbox may be controlled manually or automatically.

A gear selector lever 24 operates in a gate 50 having two limbs 51 and 52 joined by a cross track 53. When the lever 24 is in limb 51 the transmission operates in manual mode and the lever 24 is biassed to return to a central position 51a when released. Each movement of lever 24 from central position 51a to a downchange position 51b selects a downchange of one ratio in the currently operative ratio of the gearbox and each movement to an upchange position 51c selects an upchange of one ratio.

The position of lever 24 in limb 51 and 52 is sensed by a series of sensors (eg micro switches and optical sensors spaced around the gate) which are indicated collectively at 33 and whose signal outputs Vs are fed to electronic control unit 36. Control unit 36 in turn issues signals to a gear engaging mechanism 25 which includes, for example, hydraulic rams and solenoid control valves to move selector members to engage the desired gearbox ratio. One example of a suitable gear engaging mechanism is disclosed and claimed in the Applicants earlier co-pending UK Patent Application No. 9502140.8.

The limb 52 of gate 50 has four positions; a 'P' position in which lever 24 is placed when it is desired to park the vehicle when operating in the automatic ratio selection mode; an 'R' position in which the lever is placed to select reverse; an 'N' position in which the lever is placed to select neutral and a 'D' position in which the lever is placed when it is desired that the forward drive ratio of the gearbox should be selected automatically by control unit 36 in accordance with the current operating conditions of the vehicle.

When in the 'D' position the control unit 36 determines which ratio is most appropriate for the current vehicle operating conditions and issues appropriate ratio selection signals to gear engaging mechanism 25.

To determine the appropriate operating ratio control unit 36 receives signals from a plurality of vehicle operating parameter sensors such as signals Ve proportional to engine speed from engine speed sensor 26. Signals Vt are received from throttle valve position sensor 30 proportional to the current throttle opening and an accelerator pedal position sonsor 19a is also provided to feed accelerator pedal position sensor signals Va to control unit 36. In certain implementations of the system only one of the sensors 19a and 30 may be provided. Most commonly in such a situation it is sensor 19a which will be provided.

Control unit 36 also receives a gear signal Vg from gear position sensor 32 which corresponds to the gear ratio currently engaged, signals Vc from slave cylinder position sensor 34, which varying with the position of the slave cylinder 22, and signals Vdp proportional to clutch driven plate speed from speed sensor 42 which actually senses the speed of the gearbox shaft 15 (which is equal to that of a driven plate 40 of the clutch 14). A vehicle speed sensor 45, for example, of the variable reluctance type, is also provided to feed a vehicle speed signal Vv to control unit 36. Again in certain implementations driven plate speed sensor 42 may be omitted and the driving plate speed can be calculated by control unit 36 from the vehicle speed and the gear ratio currently engaged.

A buzzer 50 is connected with control unit 36 to warn/indicate to the vehicle operator when certain vehicle operating conditions occur. In addition to or in place of buzzer 50 a flashing warning light (not shown) may be used.

As indicated above control unit 36 also controls the engagement and disengagement of the clutch 14. This is done by the control unit 36 generating a reference signal Vr in a generator C which is representative of a desired engine speed. This reference signal is compared in comparator A with the actual engine speed signal Ve from engine speed sensor 26 to produce an error signal E which is compared in comparator B with the clutch actuator position signal Vc from sensor 34 to provide a clutch engagement control signal Vce which the control unit 36 outputs to the hydraulic control 38. Operation of a control unit 36 in this general manner is described in more detail, for example in the Applicants earlier European Patents 0038113 and 0043660.

In addition to controlling the engagement and disengagement of clutch 14 the control unit 36 also controls the throttle setting via a throttle control 37 when its control logic indicates that an override of the throttle opening set by the driver's operation of the accelerator 19 is desirable. In some applications the throttle control 37 may be omitted or torque reduction during gear changes can be achieved by varying engine timing and/or fuel supply (possibly using any existing electronic engine management system).

Figure 2:
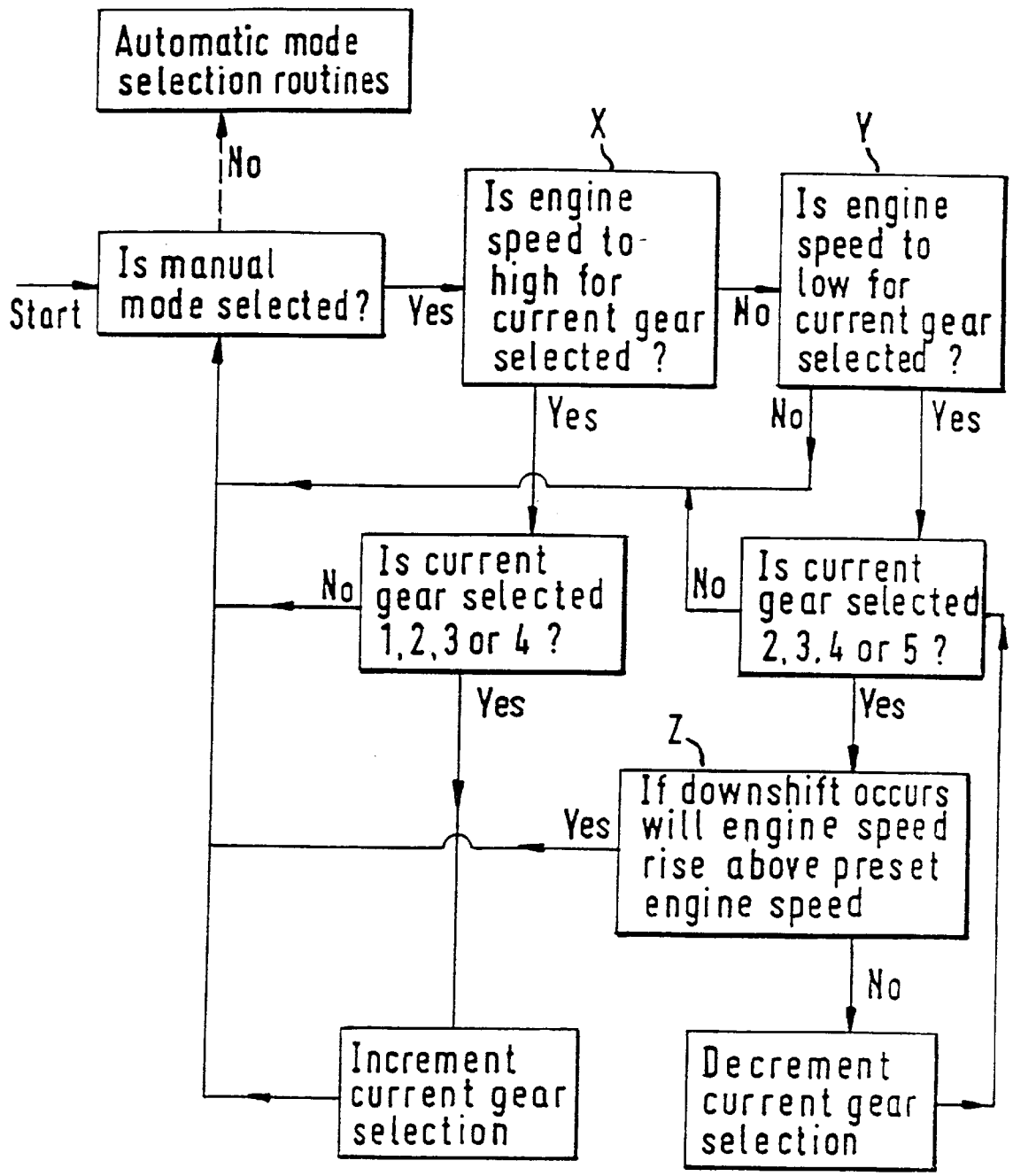
FIG. 2 shows in flow diagram form the criteria used in the manual override feature.

In accordance with the present invention the control unit 36 includes the manual override routine shown diagrammatically in FIG. 2 under which, if a predetermined operating condition occurs, when the transmission is in its manual ratio selection mode, the control unit will switch the control of the operative gearbox ratio to its automatic mode and automatically select an operative ratio which is more appropriate to the current vehicle operating conditions.

As can be seen from FIG. 2 the manual override will occur if any one of the following predetermined operating conditions occurs:

1. If a predetermined engine speed (eg 6300 rpm) is exceeded an upshift of gear ratio will be implemented.
2. If engine speed falls below a predetermined level (eg 1050 rpm) a downshift of gear ratio will be implemented provided that the engine speed rise resulting from the lower ratio selection still remains below a preset limit (eg 1050+300 rpm).

This preset limit is imposed to inhibit engine braking and ensuring the highest possible gear take-up. In certain implementations of the invention this preset limit can be omitted so that the downshift will be implemented no matter what level of engine speed results. One use of this implementation is to ensure engine braking in emergency conditions.

The test for condition 1 above is made in box X of FIG. 2 and the tests for condition 2 are made in boxes Y and Z of FIG. 2. Box Z is omitted if the preset engine speed limit is not required.

As will be appreciated, of the operator wishes to override the gear currently selected by control 36 (whether operating in the normal automatic mode or in the manual override condition) he can do so by moving the lever 24 to the appropriate position 51b or 51c in gate 50, after which this gear will be held for a specified time period, before checks are again made for the above two stated conditions.

Although the invention has been described above in relation to a transmission with both manual and automatic modes of operation it will be appreciated that it can be implemented in transmissions which do not have an automatic mode and in which the operative ratio is selected by operator movement of selector lever 24 whereupon electronic control issues the required signals to gear engaging mechanism 25 to engage the selected ratio. In such an arrangement the electronic control means will be arranged to override the gear ratio currently selected by the operator if the above described predetermined operating conditions occur.

I claim:

1. A vehicle transmission comprising a main drive clutch (14), a multi-ratio gearbox (12), a gear engaging mechanism (25) for engaging the operative ratio of the gearbox, a manually operable gear selector (24) allowing an operator to manually select the operative ratio of the gearbox when the transmission is operating a manual mode, and an electronic control means (36) which controls the disengagement and engagement of the drive clutch at start-up and stopping of the associated vehicle and during gear changes and which controls the operation of the gear engaging mechanism (25) in response to movements of the gear selector (24), the transmission being characterised in that the electronic control means (36) is arranged to override the gear ratio currently selected by the operator to select a different gear ratio for current conditions if a predetermined operating condition occurs when in its manual mode.

2. A transmission according to claim 1 characterised in that an automatic mode of operation is also provided and the electronic control means (36) also determines which gear ratio is to be selected when the transmission is operating in its automatic mode.

3. A transmission according to claim 1 characterised in that the override occurs if a predetermined engine speed is exceeded in which circumstances an upshift of the gear ratio is implemented by the electronic control means (36).

4. A transmission according claim 1 characterised in that the override occurs if the engine speed falls below a predetermined level in which circumstances a downshift of the gear ratio is implemented by the electronic control means (36).

5. A transmission according to claim 4 characterised in that the downshift is not implemented unless the resulting engine speed remains below a present level.

6. A transmission according to claim 2 characterised in that when operating in automatic mode the operator can manually override the gear ratio currently selected by movement of the gear selector (24).

7. A transmission according to claim 6 characterised in that when a manual override occurs the manually selected override ratio is held engaged by the control means for a specified time period after which the automatic override function again becomes operative.

8. A transmission according to claim 2 characterised in that the override occurs if a predetermined engine speed is exceeded, in which circumstances, an upshift of the gear ratio is implemented by the electronic control means (36).

9. A transmission according to claim 2 characterised in that the override occurs if a predetermined engine speed is exceeded, in which circumstances, an upshift of the gear ratio is implemented by the electronic control means (36).

10. A transmission according to claim 3 characterised in that the override occurs if a predetermined engine speed is exceeded, in which circumstances, an upshift of the gear ratio is implemented by the electronic control means (36).

11. A transmission according to claim 8 characterised in that when operating in automatic mode, the operator can manually override the gear ratio currently selected by movement of the gear selector (24).

12. A transmission according to claim 9 characterised in that when operating in automatic mode, the operator can manually override the gear ratio currently selected by movement of the gear selector (24).

* * * * *